United States Patent
Alexander et al.

(10) Patent No.: US 8,247,746 B2
(45) Date of Patent: Aug. 21, 2012

(54) CONNECTOR FOR HEATER

(75) Inventors: Phillip Emerson Alexander, Colchester, CT (US); David R. Lyders, Middletown, CT (US); John Vontell, Manchester, CT (US); George Alan Salisbury, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 384 days.

(21) Appl. No.: 12/605,652

(22) Filed: Oct. 26, 2009

(65) Prior Publication Data

US 2010/0170887 A1     Jul. 8, 2010

Related U.S. Application Data

(63) Continuation of application No. 11/221,195, filed on Sep. 7, 2005, now abandoned.

(51) Int. Cl.
*H05B 3/08* (2006.01)
*H01R 24/00* (2011.01)

(52) U.S. Cl. ........ 219/541; 439/626; 439/640; 439/173; 439/637; 439/638; 439/651; 439/652; 439/59; 439/79; 439/80; 439/328

(58) Field of Classification Search .................. 219/541; 439/640, 173, 637–8, 651–2, 59, 79, 80, 439/328, 626
See application file for complete search history.

(56) References Cited

U.S. PATENT DOCUMENTS

| | | | |
|---|---|---|---|
| 2,742,248 A | | 4/1956 | Le Compte et al. |
| 2,744,992 A | * | 5/1956 | Spears ........................... 219/200 |
| 4,659,161 A | * | 4/1987 | Holcomb ....................... 439/490 |
| 5,123,852 A | | 6/1992 | Gillett |
| 6,024,588 A | * | 2/2000 | Hsu et al. ....................... 439/173 |
| 6,481,965 B2 | | 11/2002 | Certain et al. |
| 2002/0162222 A1 | | 11/2002 | Williams et al. |
| 2002/0182905 A1 | | 12/2002 | Hedrick et al. |
| 2005/0008482 A1 | | 1/2005 | Allford et al. |

FOREIGN PATENT DOCUMENTS

| | | |
|---|---|---|
| CN | 1125511 | 10/2003 |
| GB | 2 322 214 | 8/1998 |
| JP | 10294157 | 11/1998 |
| JP | 11121123 | 4/1999 |

OTHER PUBLICATIONS

Australian Search Report for Australian Application No. 200605273-2, Mar. 15, 2007.
European Search Report for European Application No. 06253970.5, Jul. 9, 2009.
Extended European Search Report for European Application No. 06253970.5, Oct. 1, 2009.

* cited by examiner

*Primary Examiner* — Shawntina Fuqua
(74) *Attorney, Agent, or Firm* — Carlson, Gaskey & Olds, P.C.

(57) ABSTRACT

A connector for incorporation into a heater system for inlet struts includes a body having a tapered forward end and an opposite rear end. A plurality of forward electrical terminals are formed on the outer surface of the tapered end. A plurality of rearward electrical terminals are formed on the rear end of the body. The rearward electrical terminals are in electrical connection with the forward electrical terminals. The forward electrical terminals on the tapered end are in electrical contact with a plurality of electrical contacts connected to heating elements formed in a heating mat. The heating mat entirely envelops the connector. The heater mat is formed within a substantially rigid outer shell.

26 Claims, 5 Drawing Sheets

US 8,247,746 B2

CONNECTOR FOR HEATER

This application is a continuation of application U.S. Ser. No. 11/221,195, filed 7 Sep. 2005 now abandoned.

STATEMENT REGARDING FEDERALLY SPONSORED RESEARCH OR DEVELOPMENT

The government may have certain rights to this invention pursuant to Contract No. N00019-02-C-3003 awarded by the United States Navy.

BACKGROUND OF THE INVENTION

The present invention relates generally to turbine engines and more particularly to a connector for a heater for an inner strut of an inlet case of a turbine engine.

Some gas turbine engines, particularly gas turbine engines for military aircraft, include inlet struts in the inlet case in front of the fan. It is possible for snow and ice to accumulate on the inlet struts and to interfere with operation of the gas turbine engine. Accordingly, the assignee of the present invention has developed a heater system for the inlet struts. The heater system includes a flexible polymer mat having a plurality of metal electrical traces or heating elements formed therein. The mat is installed around the inlet strut. Electrical current through the heating elements generates heat in the mat, which melts away any snow and ice that have accumulated on the inlet strut.

SUMMARY OF THE INVENTION

The present invention provides a connector for incorporation into the heater system for inlet struts. The connector includes a body having a tapered forward end and an opposite rear end. A plurality of forward electrical terminals are formed on the outer surface of the tapered end. A plurality of rearward electrical terminals are formed on the rear end of the body. The rearward electrical terminals are in electrical connection with the forward electrical terminals.

The forward electrical terminals on the tapered end are in electrical contact with a plurality of electrical contacts connected to heating elements formed in a heating mat. The heating mat entirely envelops the connector. The heater mat is formed within a substantially rigid outer shell.

The rearward electrical terminals of the connector make electrical contact with a socket formed on the inlet strut when the shell and heater mat are inserted onto the inlet strut. Electrical power to the heater mat is thus provided from the socket on the inlet strut through the connector to the heating elements in the heater mat.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
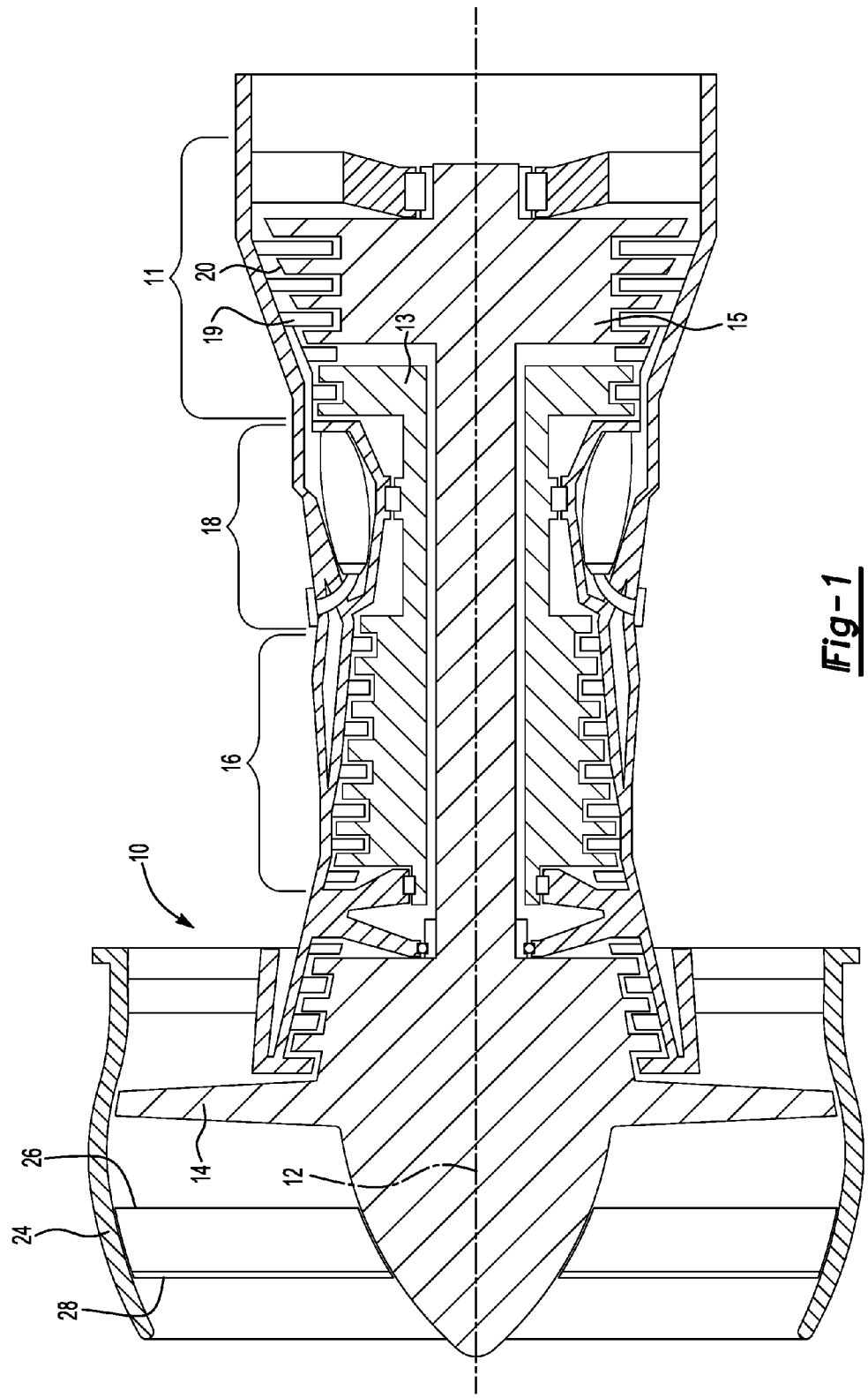
FIG. 1 is a sectional view of a gas turbine engine in which the present invention could be used.

FIG. 1 shows a gas turbine engine 10, such as a gas turbine used for power generation or propulsion, circumferentially disposed about an engine centerline or axial center line axis 12. The engine 10 includes a fan 14, a compressor 16, a combustion section 18 and a turbine 11. As is well known, air compressed in the compressor 16 is mixed with fuel that is burned in the combustion section 18 and expands in the turbine 11. The turbine 11 includes rotors 13 and 15 that rotate in response to the expansion, driving the compressor 16 and fan 14. The turbine 11 includes alternating rows of turbine blades 20 and vanes 19. The fan 14 is surrounded by an inlet case 24, which is supported by a plurality of inlet struts 26, which are positioned inside the inlet case 24 in front of the fan 14. Each of the inlet struts 26 is wrapped by a heating system 28. FIG. 1 is a somewhat schematic presentation for illustrative purposes only and is not a limitation on the instant invention, which may be employed on gas turbine engines for electrical power generation, aircraft, etc. Additionally, there are various types of gas turbine engines, many of which could benefit from the present invention, which is not noted to the design shown.

Figure 2:
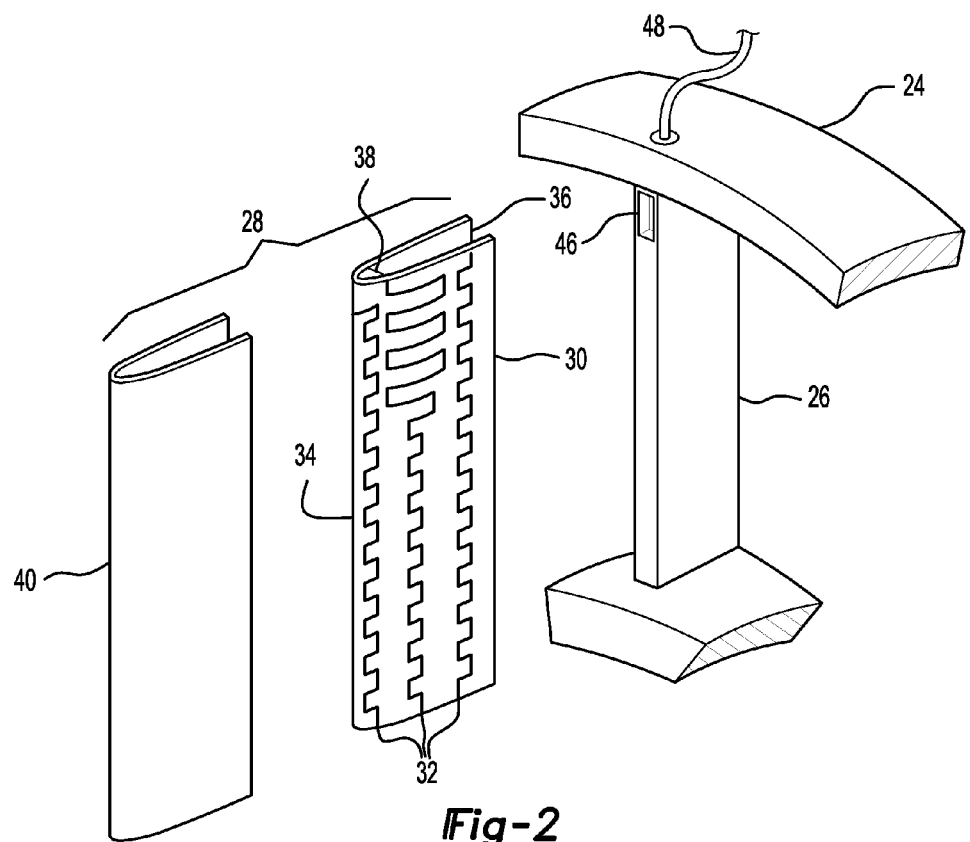
FIG. 2 is a perspective view of a section of the inlet case and inlet strut with the heater system exploded away.

FIG. 2 is an exploded perspective view of one inlet strut 26 and heating system 28. The heating system 28 generally includes a heater mat 30 having a plurality of electrical heating elements 32 formed therein. Generally, the heater mat 30 is a flexible polymer, such as Kapton, while the heating elements 32 may be a foil which may be attached to the heater mat 30 by adhesive or insert molded into the Kapton. Alternatively, the heating elements 32 may be formed by sputter deposits onto the heater mat 30. The heating elements 32 may be titanium, copper or other suitable materials. The heater mat 30 is folded to form a folded forward end 34 and an open rear end 36. An electrical connector 38 is electrically connected to the heating elements 32 and positioned in the forward end 34 of the heater mat 30. A composite outer shell 40 is formed over the heater mat 30 in the electrical heating elements 32. The outer shell 40 may be a composite structure formed of numerous plies, where the heater mat 30 is one of the plies.

A forward end of the inlet strut includes a socket 46 or other electrical connector complimentary to the electrical connector 38 in the heating system 28. Power is supplied to the socket 46 and the electrical connector 38 by a power cable 48 passing through inlet case 24 into the inlet strut 26 in connecting to the socket 46.

Figure 3:
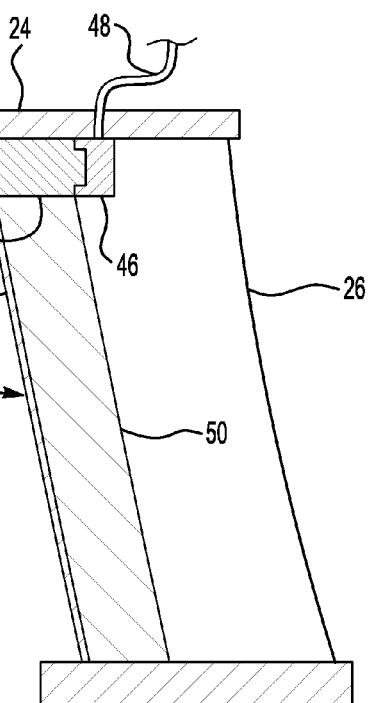
FIG. 3 is a sectional view through the shell, heater mat, connector and inlet strut of FIG. 2 in an assembled position.

Although illustrated in an exploded view in FIG. 2, the heating system 28 is shipped and installed with the outer shell 40 attached to the heater mat 30. For assembly, the heating system 28 is slid onto the inlet strut 26 by inserting the inlet strut 26 into the open rear end 36 of the heater mat 30 until the electrical connector 38 makes electrical connection with the socket 46 on the inlet strut 26 as shown in FIG. 3. Filler 50 in the forward end of the outer shell 40 may abut the inlet strut 26, thereby improving the stability of the heating system 28. The heating system 28 may be further fastened to the inlet strut 26 by fasteners or adhesive. The heating system 28 (i.e. the outer shell 40, heater mat 30 with heating elements 32 and the electrical connector 38) can be installed, removed and replaced on the inlet strut 26.

Figure 4:
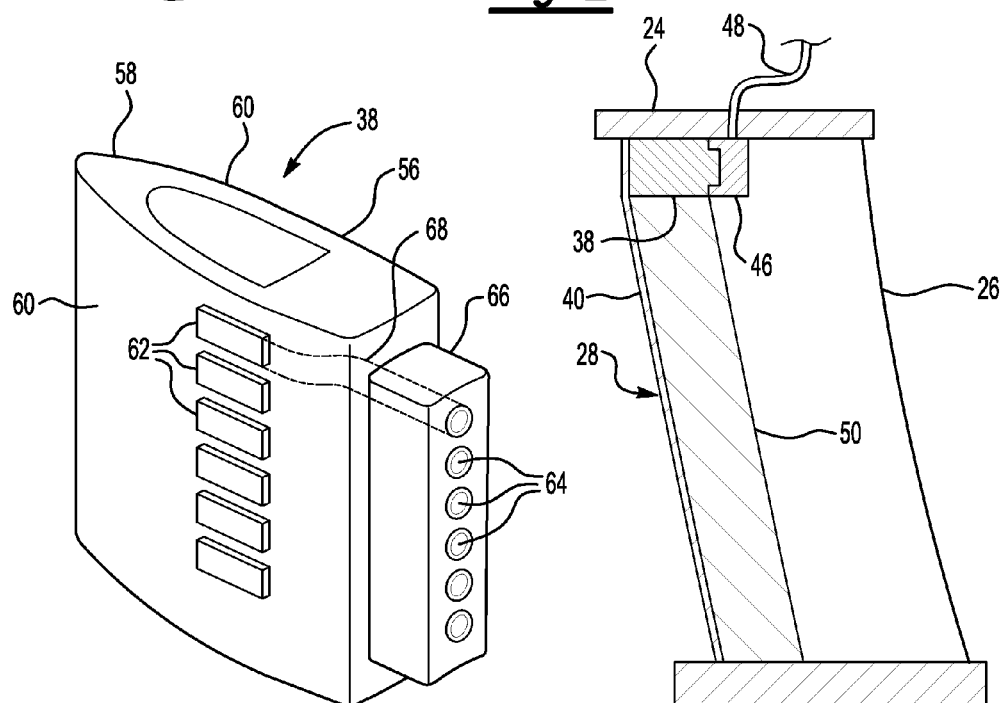
FIG. 4 is a rear perspective view of the connector.

FIG. 4 is a rear perspective view of the connector 38 of FIGS. 2-3. The connector 38 includes a body 56, which is preferably formed of a non-conductive polymer or composite. The body 56 includes a tapered forward end 58 having curved and angled outer surfaces 60. A plurality of forward terminals 62 are formed on one of the outer surfaces 60. Each of the forward terminals 62 is in electrical connection with one of a plurality of rearward terminals 64 formed on a rear end 66 of the body 56 of the electrical connector 38. In the embodiment shown, the forward terminal 62 and the rearward terminal 64 are formed on opposite ends of a plurality of conductive metal sockets 68 (one shown) insert molded in the body 56 of the electrical connector 38.

Figure 5:
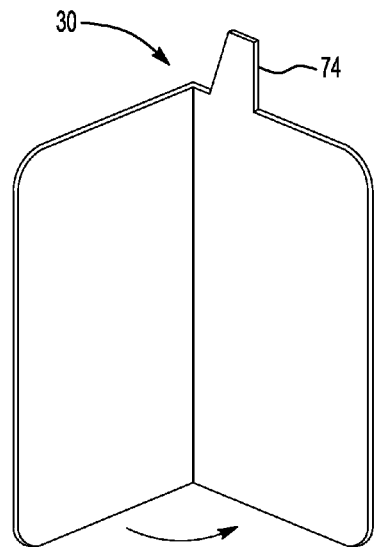
FIG. 5 is a perspective view of the heater mat in a partially unfolded position.
Figure 6:
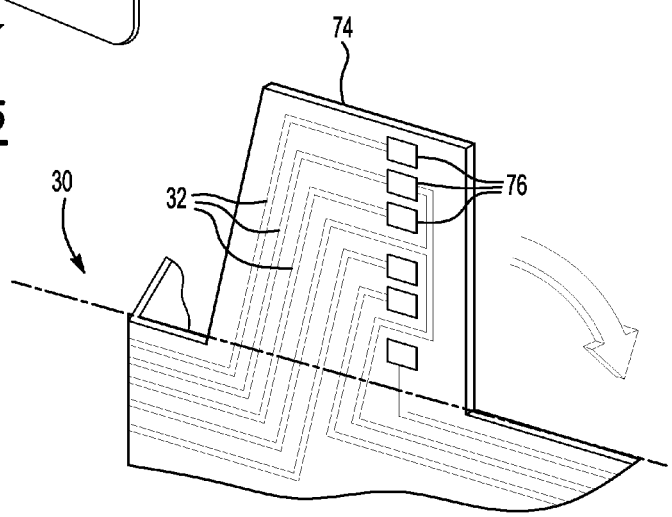
FIG. 6 is an enlarged rear perspective view of the tab and contacts on the heater mat of FIG. 5.

FIG. 5 is a perspective view showing the heater mat 30 in a partially unfolded position. As shown, the heater mat 30 includes a connection tab 74 projecting upward from the remainder of the heater mat 30. For simplicity, the heating elements 32 are not shown in FIG. 5, but FIG. 6 is an enlarged rear perspective view of the connection tab 74 of the heater mat 30 of FIG. 5. As shown, the electrical heating elements 32 lead to the connection tab 74 and are electrically connected to a plurality of electrically conductive contacts 76 on the connection tab 74. There need not be a one-to-one relationship between heating elements 32 and electrical contacts 76.

Figure 7:
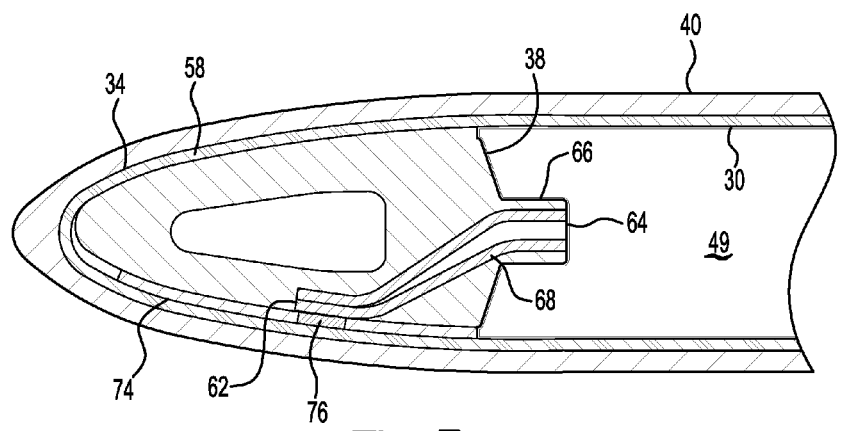
FIG. 7 is an enlarged sectional view of the connector inside the heater mat and shell.
Figure 8:
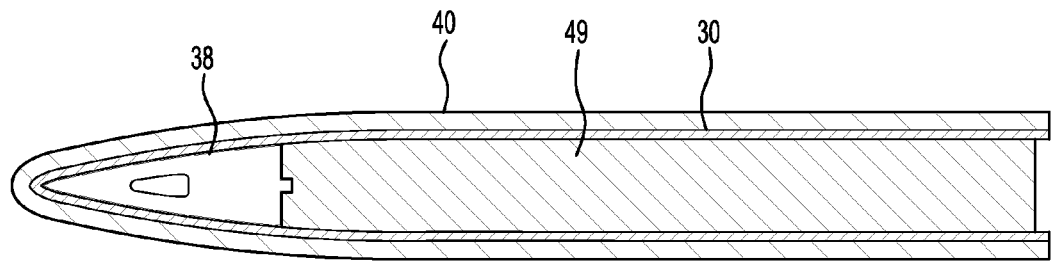
FIG. 8 is a sectional view through the heating system of FIG. 2 during manufacture on a mold.

FIGS. 6, 7 and 8 illustrate how the connector 38 of FIG. 4 and the heater mat 30 of FIGS. 5-6 are used to make the heating system 28 of FIGS. 2-3. Referring first to FIG. 6, the connection tab 74 of the heater mat 30 is first folded inwardly into the interior of the heater mat 30 as indicated by the arrow in FIG. 6, such that the contacts 76 are exposed to the interior of the heater mat 30, as shown in FIG. 7.

Referring to FIGS. 7 and 8, the connector 38 is placed in a recess at an upper corner of the mold 49 and the heater mat 30 is wrapped around the connector 38 and mold 49. The connector 38 is thereby inserted into the forward end 34 of the interior of the heater mat 30 until the forward terminals 62 of the connector 38 make electrical contact with the contacts 76. The tapered forward end 58 of the connector 38, with curved and angled outer surfaces 60, fits snugly within the forward end 34 of the heater mat 30. The connector 38 may be joined to the heater mat 30 by welding, brazing, soldering, mechanical crimping/stapling or conductive adhesive. The outer shell 40 is then formed over the heater mat 30 as a series of plies in a known manner for making composite components. The heater mat 30 is shown as the innermost ply in the outer shell 40, but could be one of the middle plies. The mold 49 is then removed from the outer shell 40, heater mat 30 and connector 38 to leave a formed heating system 28.

After removal of the mold 49, the volume below the electrical connector 38 and between the outer shell 40 and inlet strut 26 (previously occupied by the mold) may be filled with the filler 50, which may be a polymer, composite, polymer foam or other material as shown in FIG. 3. The filler 50 increases the strength and durability of the heating system 28. The electrical connector 38 and socket 46 is shown located at an upper end of the inlet strut 26 and heating system 28 but could be located at any point along the inlet strut 26.

Figure 9:
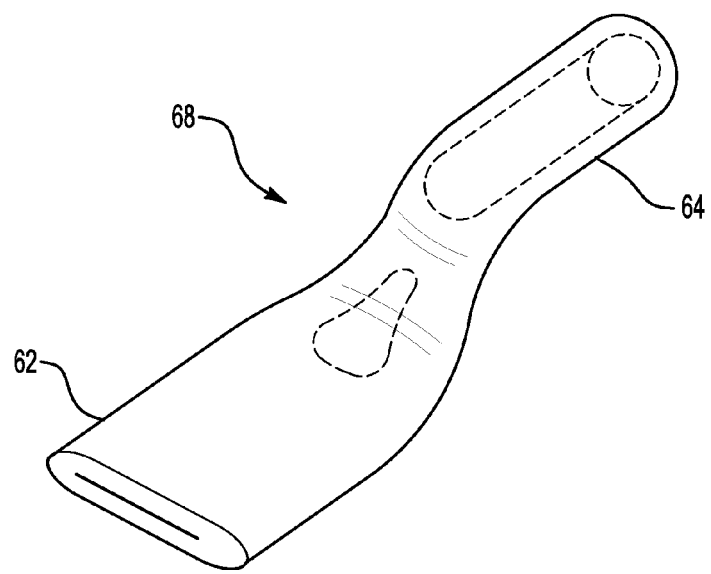
FIG. 9 is a perspective view of the socket of FIG. 7.

One of the sockets 68 from inside the connector 38 of FIG. 4 is shown in FIG. 9. The socket 68 is generally a metal conductive tube that is flattened at one end to form the forward terminal 62 and left open and round at the opposite end to form the rearward terminal 64. The socket 68 may also be bent or formed to properly locate the forward terminal 62 and rearward terminal 64. The forward terminal 62 and rearward terminal 64 could be provided in other ways.

Figure 10:
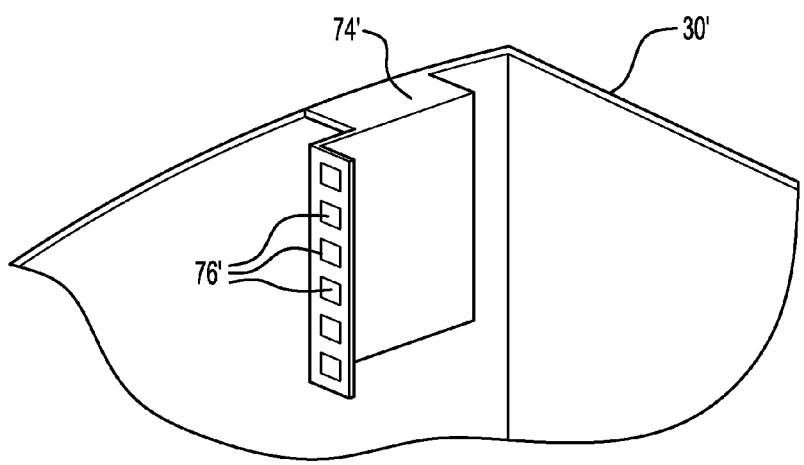
FIG. 10 is a perspective view of an alternate heater mat.
Figure 11:
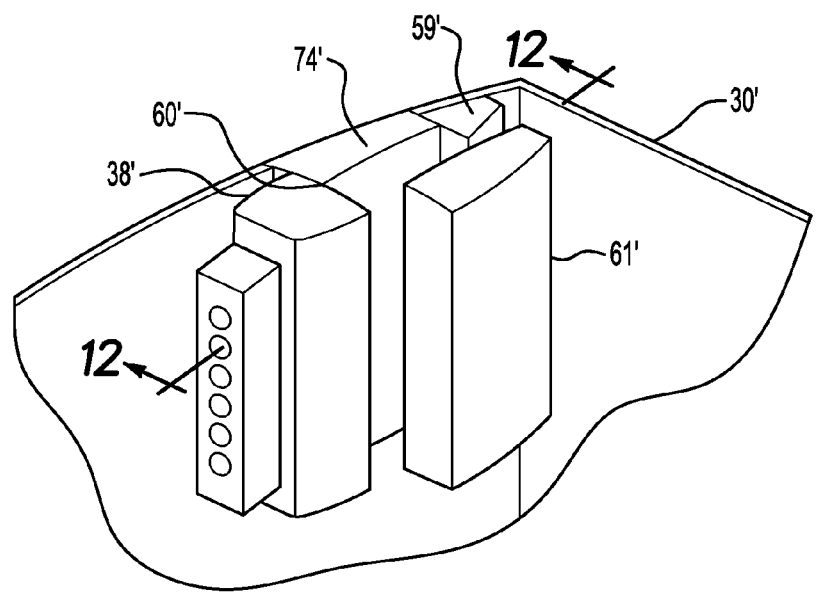
FIG. 11 illustrates the heater mat of FIG. 10 connected to an alternate connector.
Figure 12:
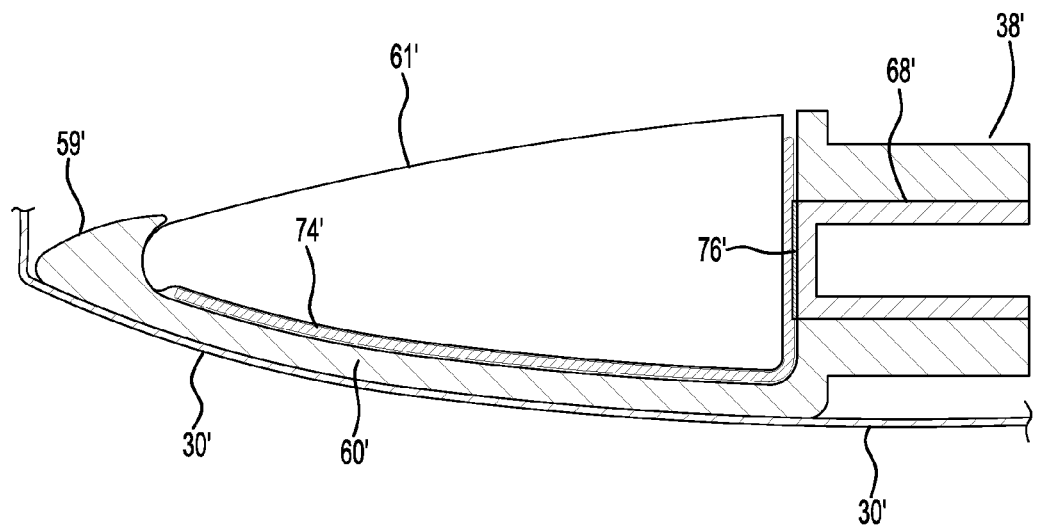
FIG. 12 is a sectional view through the connector and heater mat of FIG. 11.

FIGS. 10 through 12 illustrate an alternate way of making an electrical connection to a heater mat 30. The electrical heating elements are not shown for simplicity.

Referring to FIG. 10, the alternate heater mat 30' includes an alternate connection tab 74' projecting upward from the remainder of the heater mat 30'. A plurality of electrical contacts 76' are formed at one end of the connection tab 74'. The connection tab 74' is flexible. In FIG. 10, the connector 38' is not shown, but the connection tab 74' is shown folded twice as it would be to fit inside the connector 38' as shown in FIG. 11. Referring to FIG. 11, the alternate connector 38' includes a removable mid-portion 61' that is opposite a mid-portion 60' and behind a forward portion 59'.

To connect the electrical connector 38' to the electrical contacts 76', the removable mid-portion 61' is first removed from the connector 38'. The connection tab 74' is then folded down over the mid-portion 60' of the connector 38', and the portion of the connection tab 74' with the electrical contacts 76' is folded back. The removable mid-portion 61' is then returned to the connector 38' on top of the connection tab 74', thereby retaining the connection tab 74' within the connector 38'. The mid-portion 61' may be snap fit or friction fit, or even somewhat loosely retained in the connector 38'.

FIG. 12 is a sectional view taken along Line 12-12 of FIG. 11 after the mid-portion 61' is inserted. As shown in FIG. 12, the electrical contact 76' makes electrical contact with sockets 68' insert-molded in the connector 38'. Again, the connector 38' may be joined to the heater mat 30' by welding, brazing, soldering, mechanical crimping/stapling or conductive adhesive. The assembly shown in FIG. 12 would then be placed on the mold 49 and wrapped with the outer shell 40 as shown with respect to the first embodiment in FIGS. 7 and 8. The connector 38' and heater mat 30' of FIGS. 10-12 could be used in place of the connector 38 and heater mat 30 of FIGS. 1-9.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers in method steps are for convenient reference in dependent claims and do not indicate a required order of performance of the method steps unless otherwise specified in the claims.

What is claimed is:

1. A connector comprising:
 a body having a forward tapered end and a rear end, the tapered end including an outer surface having a pair of angled surfaces, wherein the pair of angled surfaces are the largest surfaces of the body;
 a plurality of forward terminals exposed on one of the pair of angled surfaces on the tapered end; and
 a plurality of rearward terminals on the rear end of the body, the rearward terminals in electrical connection with the forward terminals.

2. The connector of claim 1, wherein the pair of angled surfaces are convex.

3. A connector comprising:
 a body having a forward tapered end and a rear end, the tapered end including an outer surface;

a plurality of forward terminals on the tapered end, wherein the tapered end includes a removable portion removably secured over the forward terminals; and a plurality of rearward terminals on the rear end of the body, the rearward terminals in electrical connection with the forward terminals.

4. A connector and heater comprising:
a body having a forward tapered end and a rear end, the tapered end including an outer surface;
a plurality of forward terminals on the tapered end; and
a heater electrically connected to the plurality of forward terminals on the connector.

5. The connector and heater of claim 4, wherein the heater fully envelops the connector.

6. The connector and heater of claim 5, wherein the heater includes a plurality of electrical heating elements, each connected to at least one of the plurality of forward terminals.

7. The connector and heater of claim 6, wherein the plurality of electrical heating elements includes a plurality of contacts in direct contact with the plurality of forward terminals of the connector.

8. The connector and heater of claim 4, wherein the heater includes a shell in which the connector is mounted.

9. The connector and heater of claim 8, wherein the shell includes a pair of spaced apart walls joined by a forward end, the connector mounted in the forward end of the shell.

10. The connector and heater of claim 9, wherein the shell is a composite shell and the heater includes a heater mat that is a layer in the shell.

11. The connector and heater of claim 4, mounted to a turbine engine structure.

12. The connector, heater and turbine engine structure of claim 11, wherein the turbine engine structure is a strut.

13. A turbine engine including the connector, heater and strut of claim 12, wherein the strut is an inner strut of an inlet case.

14. A heater for a turbine engine strut comprising:
a heating element configured for attachment to a turbine engine strut; and
a connector in connection with the heating element, the connector having a contact at a rearward end and configured for mating with a complementary connector on the turbine engine strut.

15. The heater of claim 14, wherein the heating element is one of a plurality of heating elements formed in a pair of spaced-apart walls joined at a forward end, the pair of spaced-apart walls configured to mate with the turbine engine strut.

16. The heater of claim 15, wherein the connector is mounted in the forward end of the pair of walls.

17. The heater of claim 16, wherein the heating element is an electrical heating element.

18. A method of forming a heating system for a strut in a turbine engine including the steps of:
a. placing a connector adjacent a mold;
b. placing a plurality of heating elements over the mold;
c. connecting the plurality of heating elements to the connector;
d. forming an outer shell over the connector and the mold; and
e. removing the mold from the outer shell.

19. The method of claim 18, wherein at least a portion of the outer shell is formed over the plurality of heating elements in said step d).

20. The connector of claim 1, wherein the plurality of forward terminals are substantially flush with the outer surface.

21. A connector comprising:
a body having a forward tapered end and a rear end, the tapered end including an outer surface having a pair of angled surfaces;
a plurality of forward terminals exposed on one of the pair of angled surfaces on the tapered end, wherein the forward tapered end does not include forward terminals; and
a plurality of rearward terminals on the rear end of the body, the rearward terminals in electrical connection with the forward terminals.

22. A connector comprising:
a body having a forward tapered end and a rear end, the tapered end including an outer surface having a pair of angled surfaces;
a plurality of forward terminals exposed on one of the pair of angled surfaces on the tapered end; and
a plurality of rearward terminals on the rear end of the body, the rearward terminals in electrical connection with the forward terminals, wherein the rear end only includes the plurality of rearward terminals, and wherein all of the plurality of rearward terminals are only connected to the plurality of forward terminals.

23. A turbine engine strut and the heater of claim 14, the heating element attached to the turbine engine strut, the connector in electrical connection with the complementary connector on the turbine engine strut, such that the connector supplies electricity to the heating element.

24. The turbine engine strut and the heater of claim 23, wherein the heating element is one of a plurality of heating elements formed in a pair of spaced-apart walls joined at a forward end, the pair of spaced-apart walls connected to the turbine engine strut.

25. A connector comprising:
a body having a forward tapered end and a rear end, the tapered end including an outer surface having a pair of angled surfaces, wherein the pair of angled surfaces are the largest surfaces of the body;
a plurality of first terminals exposed on one of the pair of angled surfaces on the tapered end; and
a plurality of second terminals on a surface of the body which is adjacent at least one of the pair of angled surfaces, the second terminals in electrical connection with the first terminals.

26. The connector of claim 25, wherein the pair of angled surfaces are convex.

* * * * *